United States Patent
Tarawneh et al.

(10) Patent No.: US 10,922,867 B2
(45) Date of Patent: Feb. 16, 2021

(54) SYSTEM AND METHOD FOR RENDERING OF AN ANIMATED AVATAR

(71) Applicants: Enas Tarawneh, Mississauga (CA); Michael Jenkin, Toronto (CA)

(72) Inventors: Enas Tarawneh, Mississauga (CA); Michael Jenkin, Toronto (CA)

( * ) Notice: Subject to any disclaimer, the term of this patent is extended or adjusted under 35 U.S.C. 154(b) by 0 days.

(21) Appl. No.: 16/708,891

(22) Filed: Dec. 10, 2019

(65) Prior Publication Data

US 2020/0118324 A1 Apr. 16, 2020

Related U.S. Application Data (62) Division of application No. 15/968,153, filed on May 1, 2018, now Pat. No. 10,580,187.

(51) Int. Cl.

| | |
|---|---|
| *G06T 13/40* | (2011.01) |
| *G06T 11/20* | (2006.01) |
| *G10L 15/02* | (2006.01) |
| *G06T 13/20* | (2011.01) |

(52) U.S. Cl.
CPC ............ *G06T 13/40* (2013.01); *G06T 11/206* (2013.01); *G06T 13/205* (2013.01); *G10L 15/02* (2013.01); *G10L 2015/025* (2013.01)

(58) Field of Classification Search
CPC ..... G06T 13/40; G06T 11/206; G06T 13/205; G06T 13/20; G06T 13/80; G06T 11/203; G06T 13/00; G10L 15/02; G10L 2015/025; G06F 16/9024; G06F 16/24568; H04N 21/4788; G06K 9/00758
See application file for complete search history.

(56) References Cited

U.S. PATENT DOCUMENTS

| | | |
|---|---|---|
| 6,433,784 B1 | 8/2002 | Merrick et al. |
| 6,987,516 B2 | 1/2006 | Dery |
| 7,019,749 B2 | 3/2006 | Guo et al. |
| 7,136,818 B1 | 11/2006 | Cosatto et al. |
| 7,260,539 B2 | 8/2007 | Cosatto |
| 7,529,674 B2 | 5/2009 | Gong et al. |
| 8,745,152 B2 | 6/2014 | Rapo |
| 9,240,180 B2 | 1/2016 | Conkie et al. |
| 9,400,695 B2 | 7/2016 | Sylvan et al. |
| 9,717,982 B2 | 8/2017 | Quinn et al. |

(Continued)

*Primary Examiner* — Haixia Du
(74) *Attorney, Agent, or Firm* — Bhole IP Law; Anil Bhole; Marc Lampert (57) ABSTRACT

There are provided systems and methods for rendering of an animated avatar. An embodiment of the method includes: determining a first rendering time of a first clip as approximately equivalent to a predetermined acceptable rendering latency, a first playing time of the first clip determined as approximately the first rendering time multiplied by a multiplicative factor; rendering the first clip; determining a subsequent rendering time for each of one or more subsequent clips, each subsequent rendering time is determined to be approximately equivalent to the predetermined acceptable rendering latency plus the total playing time of the preceding clips, each subsequent playing time is determined to be approximately the rendering time of the respective subsequent clip multiplied by the multiplicative factor; and rendering the one or more subsequent clips.

6 Claims, 5 Drawing Sheets

(56) References Cited

U.S. PATENT DOCUMENTS

2009/0278851 A1* 11/2009 Ach ................... G06T 13/40
                                                    345/473
2010/0123723 A1*  5/2010 Collard ............... G06T 13/00
                                                    345/473

* cited by examiner

SYSTEM AND METHOD FOR RENDERING OF AN ANIMATED AVATAR

TECHNICAL FIELD

The following is related generally to computer animation and more specifically to a system and method for rendering of an animated avatar.

BACKGROUND

As robotics and internet-of-things (IOT) applications grow and become more pervasive, human-machine interaction necessarily grows as well. Increasingly, this interaction involves audio or oral interactions between a human user and an artificially intelligent device; for example, oral interaction with an intelligent personal assistant located in a smart speaker device. Generally, this interaction involves capturing the audio signal of the user locally, sending this audio signal to a cloud computing resource, utilizing a machine learning technique to digitally parse and identify words and phrases in the audio signal, using a machine learning technique to build a response to the sequence of words, and transmitting this to the human user and rendering it. In some cases, in order to allow users to add their own concepts to the response system, hooks can be programmed for application specific responses.

The above determined response can, in some cases, take the form of a sequence of words or actions to be sent back to the local environment. Actions can be, for example, to control IOT devices or to control an autonomous system. Where the response is a sequence of words, a response can be delivered to the user, often via computer-generated speech. In this case, the cloud computing resource can be used to convert the words to an audio file via a computer-generated speech technique, the audio file can be sent to the device local to the user, and the audio file can be played for the user.

These applications are generally limited in that they only involve audio or text interactions or interfaces, or IOT action responses.

SUMMARY

In an aspect, there is provided a method for rendering of an animated avatar with a response on one or more computing devices, the method comprising: receiving the response, the response comprising a plurality of pieces; determining a first rendering time of a first clip of an animation of the avatar as approximately equivalent to a predetermined acceptable rendering latency, the first clip comprising one or more sequential pieces of the response, a first playing time of the first clip determined as approximately the first rendering time multiplied by a multiplicative factor; rendering the first clip of the animation of the avatar; determining a subsequent rendering time for each of one or more subsequent clips of the animation of the avatar, each of the subsequent clips comprising one or more sequential pieces of the response that succeed the preceding clip of the animation of the avatar, each subsequent rendering time is determined to be approximately equivalent to the predetermined acceptable rendering latency plus the total playing time of the preceding clips, each subsequent playing time is determined to be approximately the rendering time of the respective subsequent clip multiplied by the multiplicative factor; and rendering the one or more subsequent clips of the animation of the avatar.

In a particular case, the multiplicative factor being an approximation of the ratio between a playing time of a representative clip and a rendering time of that respective clip.

In another case, the first clip and at least one of the one or more subsequent clips are rendered approximately contemporaneously.

In yet another case, the playing time of the first clip is reduced such that the first clip ends at a natural break in speech in the response, and wherein the playing time of each of the subsequent clips are reduced such that and each of the subsequent clips end at a natural break in speech in the response.

In yet another case, the natural breaks in speech comprise a break between words or at a punctuation.

In yet another case, the natural breaks in speech comprise a break that is closest in time to the total respective rendering time of the respective clip.

In yet another case, each of the pieces are phonemes of the response.

In another aspect, there is provided a system for rendering of an animated avatar displayable on a user interface with a response received from a response generation engine, the system comprising one or more processors and a data storage device, the one or more processors configured to execute: a parsing module to receive the response, the response comprising a plurality of pieces; and a rendering module to: determine a first rendering time of a first clip of an animation of the avatar as approximately equivalent to a predetermined acceptable rendering latency, the first clip comprising one or more sequential pieces of the response, a first playing time of the first clip determined as approximately the first rendering time multiplied by a multiplicative factor; render the first clip of the animation of the avatar; determine a subsequent rendering time for each of one or more subsequent clips of the animation of the avatar, each of the subsequent clips comprising one or more sequential pieces of the response that succeed the preceding clip of the animation of the avatar, each subsequent rendering time is determined to be approximately equivalent to the predetermined acceptable rendering latency plus the total playing time of the preceding clips, each subsequent playing time is determined to be approximately the rendering time of the respective subsequent clip multiplied by the multiplicative factor; and render the one or more subsequent clips of the animation of the avatar.

In a particular case, the multiplicative factor being an approximation of the ratio between a playing time of a representative clip and a rendering time of that respective clip.

In another case, the first clip and at least one of the one or more subsequent clips are rendered approximately contemporaneously on separate processors.

In yet another case, the playing time of the first clip is reduced such that the first clip ends at a natural break in speech in the response, and wherein the playing time of each of the subsequent clips are reduced such that and each of the subsequent clips end at a natural break in speech in the response.

In yet another case, the natural breaks in speech comprise a break between words or at a punctuation.

In yet another case, the one or more processors of the system are on a remote computing device that is remote to a local computing device connected to the user interface, the remote computing device in communication with the local computing device over a computer network.

In yet another case, the parsing module deconstructs the response into each of the pieces, wherein each of the pieces are phonemes of the response.

In another aspect, there is provided a method for rendering of an animated avatar on one or more computing devices using one or more animated delay clips between responses of the animated avatar, the method comprising: generating an avatar delay graph (ADG) by associating each of the animated delay clips with a directed edge in the ADG, associating a playing length of the animated delay clip with the respective edge, each edge connected to at least one other edge via a node, each node associated with a point at which the animated delay clips associated with the edges terminating and emanating at the node can be stitched together; selecting an initial node of the ADG to be a current node; determining whether a response is being processed, and while there is no response being processed: rendering one or more animated delay clips using the ADG the rendering comprising: stochastically selecting one of the edges emanating from the current node; updating the current node to be the node at which the selected edge is terminated; and rendering the animated delay clip associated with the selected edge; and communicating the rendered one or more animation delay clips to be displayed.

In a particular case, the rendering further comprising repeatedly: stochastically selecting one of the edges emanating from the current node; updating the current node to be the node at which the selected edge is terminated; and rendering the animated delay clip associated with the selected edge.

In another case, an expressive state vector is an encoding of an expressive state of the animated avatar as perceived by the user, a current expressive state being a current value of the expressive state vector, each of the edges are associated with a value for the expressive state vector, the method further comprising selecting an initial expressive state vector as the current expressive state vector and the rendering further comprising updating the current expressive state vector based on the expressive state vector associated with the selected edge when such edge is selected.

In yet another case, the edges are selected using a probability inversely proportional to a distance between the current expressive state and expressive state values associated with each of the respective selectable edges.

In another case, a system for rendering of an animated avatar using one or more animated delay clips between responses of the animated avatar, the animated avatar displayed on a user interface, the system comprising one or more processors and a data storage device, the one or more processors configured to execute a delay module to: generate an avatar delay graph (ADG) by associating each of the animated delay clips with a directed edge in the ADG, associating a playing length of the animated delay clip with the respective edge, each edge connected to at least one other edge via a node, each node associated with a point at which the animated delay clips associated with the edges terminating and emanating at the node can be stitched together; select an initial node of the ADG to be a current node; determine whether a response is being processed, while there is no response being processed: render one or more animated delay clips using the ADG the rendering comprising: stochastically selecting one of the edges emanating from the current node with a probability inversely proportional to a distance between an expressive state vector associated with the respective edge and a vector of the same rank associated with the animated delay clip; updating the current node to be the node at which the selected edge is terminated; and rendering the animated delay clip associated with the selected edge; and communicate the rendered one or more animation delay clips to the user interface.

In a particular case, the one or more processors of the system are on a remote computing device that is remote to a local computing device connected to the user interface, the remote computing device in communication with the local computing device over a computer network, and wherein at least one of the animated delay clips is locally cached on the local computing device.

These and other aspects are contemplated and described herein. It will be appreciated that the foregoing summary sets out representative aspects of systems and methods to assist skilled readers in understanding the following detailed description.

DESCRIPTION OF THE DRAWINGS

A greater understanding of the embodiments will be had with reference to the Figures, in which.

DETAILED DESCRIPTION

It will be appreciated that for simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

It will be appreciated that various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

It will be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

In accordance with the foregoing, in one aspect, a system and method for rendering of an animated avatar is provided.

While some artificially intelligent devices, such as smart speakers, interact with a user via audio-only responses, this may not be ideal. Generally, humans interact best when the other party is represented both auditorily and visually. In this way, visual cues can be exchanged to provide a more meaningful and realistic interaction.

However, animating an audio signal, such as those generated as a response to an artificially intelligent device, to correspond with an anthropomorphic avatar is an especially challenging technical problem.

An exemplary approach for animating an avatar using an audio signal involves decomposing the audio signal into basic components; for example, phonemes. The audio signal can be decomposed using, for example, natural language processing on the audio signal to generate the corresponding text, which can be parsed into sequences of phonemes. For each phoneme, there is a database of one or more corresponding avatar animations to execute. If these animations are sufficiently synchronized with the audio signal, the avatar can appear to generally realistically talk.

The above approach can be augmented by encoding into the audio signal being generated a collection of hints as to what the avatar should be doing; for example, should it simulate being happy or sad at a certain point in the sequence. This can be used to fine tune the animations that are being generated.

A limitation of the above approach can be that it requires substantive computational resources in the computing pipeline in order to graphically render the animation. Further, where the generated response is somewhat long, a user is typically going to be annoyed having to wait for the full animation to be generated and rendered before being able to view it. Accordingly, this can significantly affect uptake of animated response technology. Even if a system starts playing part-way through rendering of the full response, the user will nonetheless generally have to wait until a sufficiently long sequence has been generated.

Figure 2:
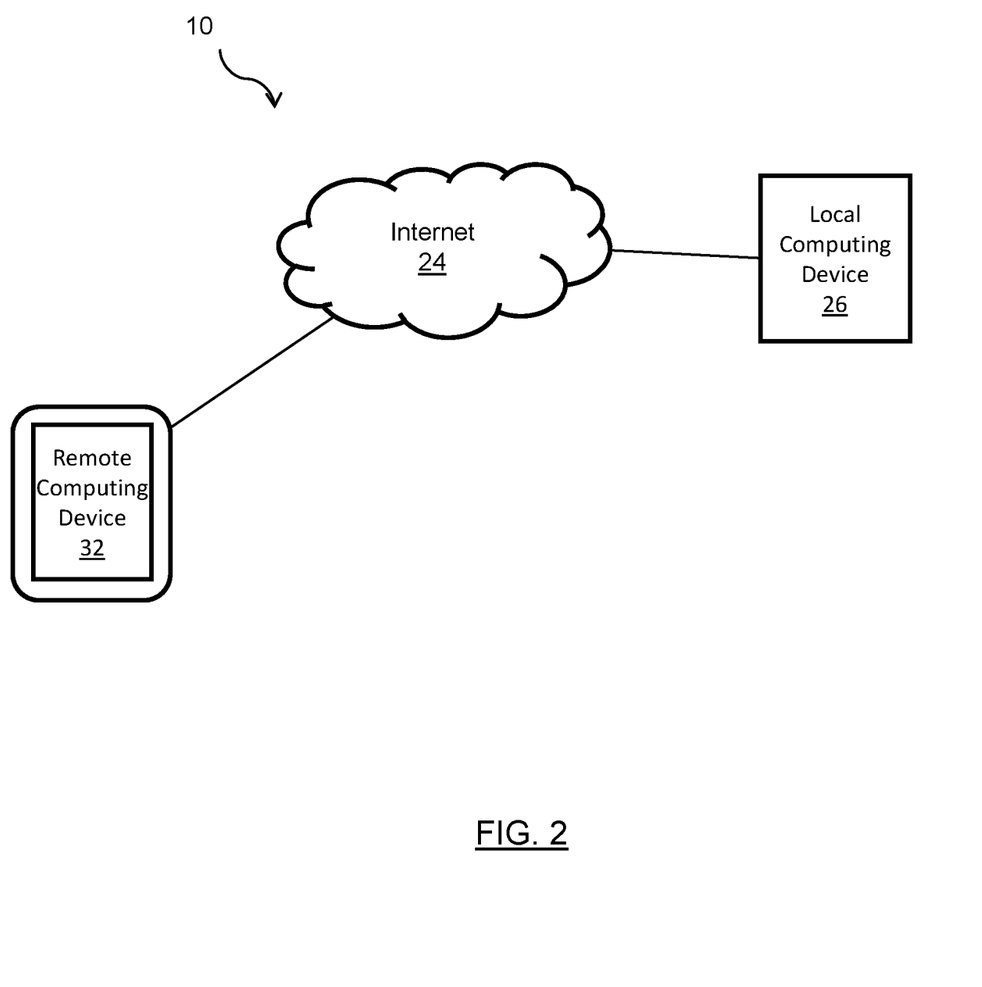
FIG. 2 is a schematic diagram showing an exemplary operating environment for the system of FIG. 1.

FIG. 2 shows an exemplary computing environment 10 of the embodiments described herein. In this example, a local computing device 26 communicates with, and accesses content located on, a remote computing device 32 over a network, such as the internet 24. The remote computing device 32 can be a centralized server or a distributed computing architecture, such as a cloud computing resource. In further embodiments, embodiments of methods and systems described herein can be run on the remote computing device 32 or run partially on the remote computing device 32 and partially on the local computing device 26. It is understood that the remote computing device 32 may be in communication with multiple local computing devices 26, and vice versa.

Figure 1:
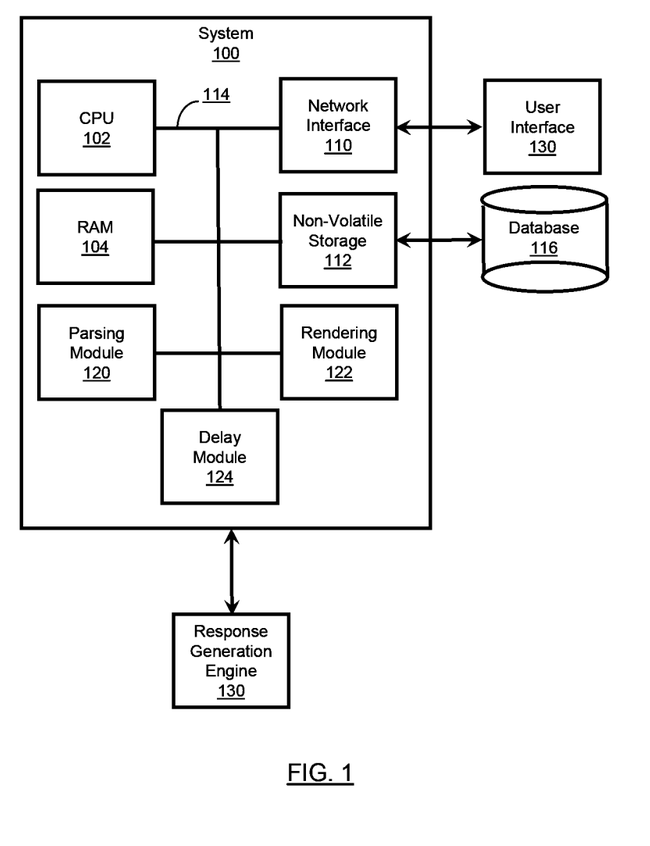
FIG. 1 is a schematic diagram of a system for rendering of an animated avatar, in accordance with an embodiment.

FIG. 1 shows various physical and logical components of an embodiment of a system 100 for rendering of an animated avatar. As shown, the system 100 has a number of physical and logical components, including at least one central processing unit ("CPU") 102 (comprising one or more processors), random access memory ("RAM") 104, a network interface 110, non-volatile storage 112, and a communication link 114 enabling CPU 102 to communicate with the other components. The communication link 114 can be, for example, a local bus, a network communication link, or the like. CPU 102 executes an operating system, and various modules, as described below in greater detail. RAM 104 provides relatively responsive volatile storage to CPU 102. The network interface 110 permits communication with other systems, such as other computing devices and servers remotely located from the system 100. In some cases, the network interface 110 communicates with a user interface 130 located on the local computing device 32. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution.

In an embodiment, the system 100 further includes a parsing module 120, a rendering module 122, and a delay module 124. In some cases, some or all of the operations and/or functions of the various modules 120, 122, 124 may be executed either all on the remote computing device 32, all on the local computing device 26, or partly on the remote computing device 32 and partly on the local computing device 26.

Advantageously, the system 100 can parallelize rendering of the avatar. The parsing module 120 can deconstruct a determined response into smaller pieces. The rendering module 122 can render those pieces in parallel. These rendered clips can then be communicated to the user interface 130, via the network interface 110, where it can be presented sequentially to the user. "Clip," as referred to herein, refers to a sequence of animation frames animating the avatar.

If the relationship between playing time, $T_p$, and rendering and network latency time, $T_r$, is approximated as a multiplicative factor ($\kappa$), so $T_p = \kappa T_r$. If there is also a predetermined acceptable rendering latency (T), then a first rendering stream generally has T seconds to render a first clip; resulting in a length of $\kappa T$ of animated video.

In some cases, the multiplicative factor ($\kappa$) can be determined experimentally and can model an efficiency for the rendering module 122. For example, if $\kappa=1$ then the rendering module 122 is able to render in real time (playing time of the animation), if $\kappa>1$ then it can render in greater than real time, and if $\kappa<1$ then it is less efficient than real time. In many cases, $\kappa$ also includes communication latency between the rendering module 122 and the user interface 130. The acceptable latency value T models generally a length of time a hypothetical user is willing to wait for a response. In an example, T values between 500 milliseconds and 1.5 seconds would be acceptable latency values.

In some cases, a second rendering stream can also begin rendering a second clip right away, the second clip being for a portion of the animation starting after the first clip. This second rendering stream generally has an initial latency period, plus the first clip's playing time, within which to render. Thus, the second rendering stream has T+κT seconds of rendering time and produces κ (T+κT) seconds of rendered animated video. In a particular case, the second rendering stream is rendered on a separate processor or computing device than the first rendering stream such that they can be rendered in parallel.

More generally for n rendering streams, and in some cases, n processors or computing devices rendering the n rendering streams:

$$T_r^n = T + \Sigma_{i=0}^{n-1} T_p^i.$$

Where $T_r^n$ is the rendering time of the n'th rendering stream and $T_p^n$ is the playing time of the n'th clip. Thus, the above equation indicates that the n'th rendering component has rendering time T (the latency to start) plus the playing time of all the clips preceding the start of clip n. Under the assumption that $T_p = \kappa T_r$, then:

$$T_r^n = T + r\Sigma_{i=0}^{n-1} T_r^i.$$

The above second equation illustrates that the above can be represented in terms of rendering time. Thus, a rendering time for a first rendering stream is T, the second rendering stream is $T + rT_r^1$, and so on. Advantageously, this provides break points in the video to be played such that each rendering task can distributed over a number of processors. Further, the above equation can provide resource allocation by providing a maximum number of processors that need to be allocated to the task of rendering a given avatar response.

In some cases, it is desirable to stitch sequential clips together when playing them so that arbitrary clip points can be avoided. In these cases, instead of using the break points identified as above, being the playing time of each clip, the system 100 can treat the theoretical break points above as maximum values and seek the next earliest point in the response that corresponds to a word break, punctuation, or other natural break in speech. Advantageously, the use of natural speech break points can provide more natural break points in rendering of the animation. In an example, suppose there is a break point $T_p$ identified as described above. Rather than splitting the response at this point, the parsing module 120 can scan backwards (towards the beginning of the respective clip) searching and selecting a first break in the response; for example, either a punctuation or a space between words. In this example, the time moving backwards until the first word break is referred to as $T_B$ and the time until the first punctuation is referred to as $T_P$. Each of the times are weighted by $\kappa_B$ and $\kappa_P$ respectively. The rendering module 122 selects which of $T_B\kappa_B$, $T_P\kappa_P$, and $V_{max}$ has the smallest value as the break point. In this case, $V_{max}$ is a maximum weighted distance to backup. In some cases, larger backup values can reduce the effectiveness of parallelism provided by the system 100. Thus, a value of $V_{max}$ may be a small number of seconds in some cases. While, generally, this is not a large issue for English text as word break occurs quite frequently, it may be more prevalent where there are very long words. In the case of long words, it can be desirable to break the utterance in the middle of the word. Note that in some cases, especially for very short duration clips, one or more of $T_B$ and $T_P$ may not exist.

Figure 3:
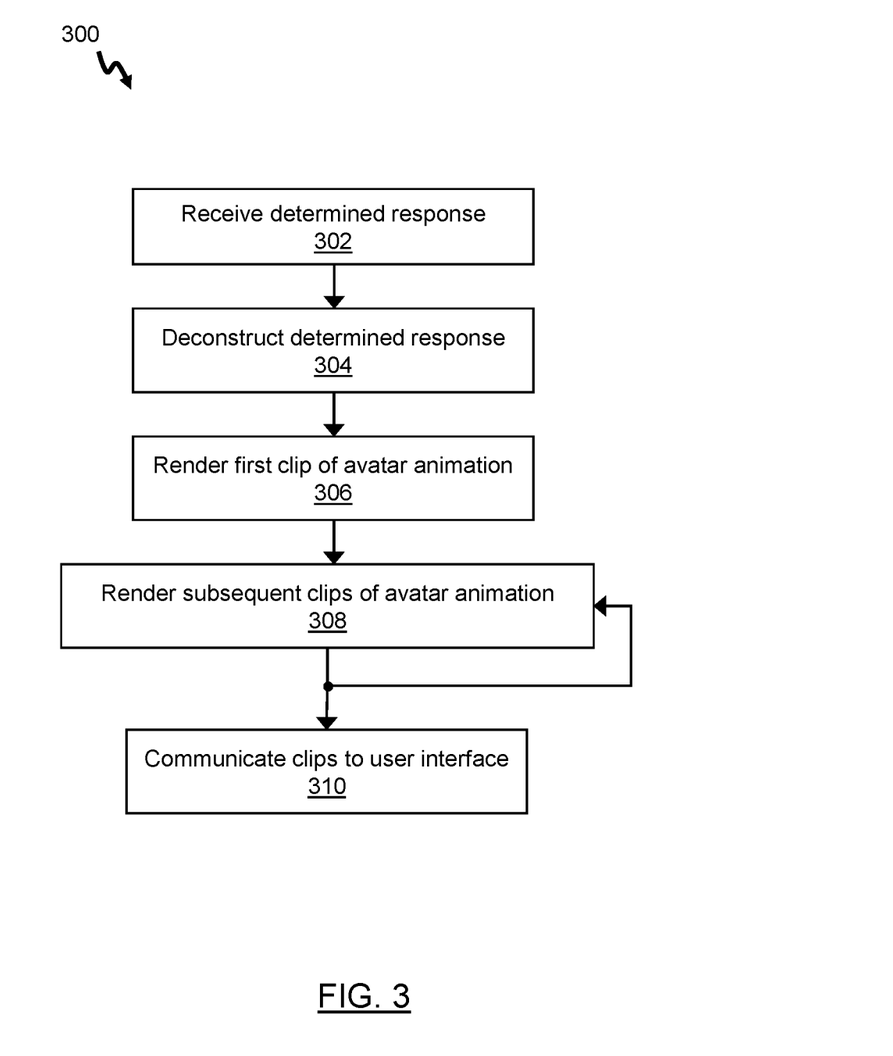
FIG. 3 is a flow chart of a method for rendering of an animated avatar, in accordance with an embodiment.

FIG. 3 shows an embodiment of a method 300 for rendering of an animated avatar. At block 302, a determined response (also referred to as an utterance) is received from a conventional response generation engine 130. The response generation engine 130 can be executed on the remote computing device 32 or on another computing device in communication with the remote computing device. The response generation engine 130 can receive an input, such as an auditory query, from a user. Utilizing a machine learning technique, the response generation engine 130 can digitally parse and identify words from the input and use a machine learning technique to determine a response to the input.

At block 304, the parsing module 120 deconstructs the determined response into smaller response pieces. In most cases, the smaller cases can be phonemes. In further cases, the smaller pieces can be other demarcations of language, such as each piece being a particular word. In further cases, the determined response can be received from the response generation engine already in the smaller pieces.

At block 306, the rendering module 122 renders a first clip of the avatar's animation. The first clip comprises one or more sequential response pieces. The overall length of playing time of the first clip is determined by the rendering module 122 as a multiplicative factor multiplied by an acceptable rendering latency time. The multiplicative factor being an approximation of the ratio between a playing time of a representative clip and a rendering time of that respective clip. In some cases, the representative clip can be an experimental clip used to determine the multiplicative factor. In other cases, the representative clip can be the first clip. In some cases, the multiplicative factor can be an approximation of the ratio between a playing time of a representative clip and a rendering time, plus a network latency time, of that respective clip. The network latency time being approximately the latency between the remote computing device 32 and the local computing device 26.

At block 308, the rendering module 122 renders one or more subsequent clips of the avatar's animation. Each of the subsequent clips being a portion of the animation starting after the clip that precedes it; for example, a second clip being the portion of the animation that follows the first clip, a third clip being the portion of the animation that follows the second clip, and so on until, in some cases, the end of the determined response is reached. Each of the subsequent clips has a rendering time that is equal to or less than the totality of the playing times of the preceding clips plus a predetermined acceptable rendering latency. The total playing time of each clip is equal to the respective rendering time multiplied by the multiplicative factor.

At block 310, when each of the animation clips are rendered, each respective clip is communicated to the user interface 130 via the network interface 110 to be displayed by the user interface 130 to the user in sequential order received, producing a full animation of the determined response.

In some cases, the delay module 124 can stall, or add unintended latency, to the animated video being generated where desirable. In a particular case, this delay can be obscured by cyclically playing the animated video back and forth a small amount in order to avoid the appearance of the animated avatar being stuck or stuttering to the user. Such cyclically playing (also referred to as "rolling") of the animated video backwards and forwards can be used to hide unexpected latency.

In some cases, between utterances, the avatar should not be still. Rather, the system 100 should render animations for the avatar to engage in apparently normal motion when not providing a response or engaged with the user. In some cases, the system 100 should render the avatar to transit from this delay behavior to utterance behaviour approximately seamlessly. The delay module 124 can accomplish this behaviour by pre-rendering, and in some cases, sending to the user interface 130 and caching, a plurality of idle renderings that can be played when the avatar is idle. These idle renderings can be combined together by the delay module 124 to make arbitrarily long sequences of idle behaviour.

Figure 4:
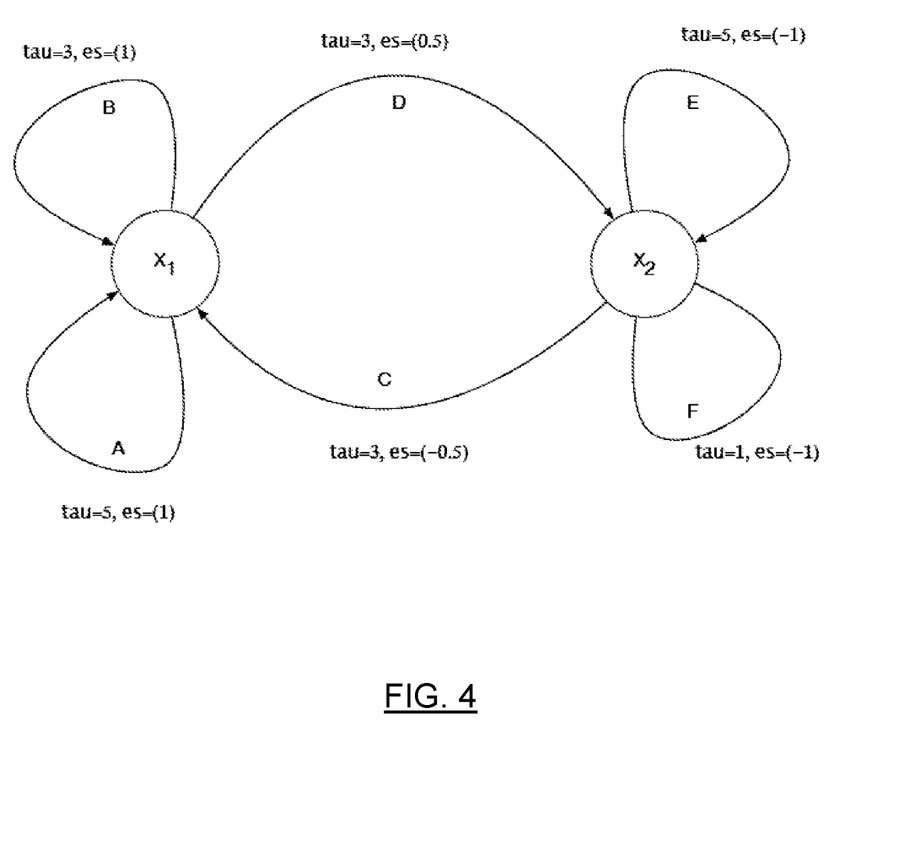
FIG. 4 is a diagram of an example of an avatar delay graph (ADG)

In an embodiment, an avatar delay graph (ADG) can be used by the delay module 124 to provide a formal structure to encode short idle animation sequences. These idle animation sequences can be played at the user interface 130 to provide an animation of the avatar between utterances. In some cases, the short idle animation sequences can be locally cached on the local computing device 26. The ADG can also be used to provide a mechanism within which to obscure rendering and transmission latencies, which are generally unavoidable given the distributed rendering of the avatar.

The ADG is modelled as a labelled directed graph: $G=(V, E)$, where $V=\{x_1, x_2, \ldots, x_n\}$ and $E=\{e_1, e_2, \ldots, e_n\}$. Nodes, labelled $x_1, x_2, \ldots, x_n$, correspond to points at which specific animation sequences can be stitched together smoothly. Edges, labelled $e_1, e_2, \ldots, e_n$, model individual animation sequences. Each edge, for example $e=(x_a, x_b)$, is labelled with tau $\tau(e)$, where the length of time required to play or present the animation sequence, tau $\tau(e)$, corresponds to edge e. When the avatar is animated with the animation sequence corresponding to edge e, the avatar's representation within the ADG transits from one edge to another, for example $x_a$ to $x_b$. In most cases, also associated with edge e is an "expressive state" $es=(s_1, s_2, \ldots s_p)$, which is an encoding of the nature of the avatar as it is perceived by a user. The expressive state for each graph can have a predetermined dimensionality to allow the graph to represent more or less complex expressive state transitions; the dimensionality of es can be avatar dependent.

Initially, animation of the avatar is in some node x and has some avatar state S. When the avatar is not animated providing a response or uttering an expression, the animation of the avatar notionally traverses the ADG in a stochastic manner, as described below. When in node x, one of the edges departing from x is selected. For each candidate edge $e_i$, the delay module 124 determines a distance from S to $es(e_i)$, represented as $d_i=|S-es(e_i)|$. The delay module 124 then selects randomly from each of the incident edges with a probability inversely proportional to this distance. Specifically, with a probability proportional to $1/(d_i+\epsilon)$. Once an edge $e_{best}$ is selected, the avatar's state S is updated using $S'=\lambda S+(1-\lambda)es(e_{best})$, where $e_{best}$ is the outgoing edge chosen. Generally, $\epsilon$ is selected to be a relatively small number in order to avoid the computation $1/d_i$ becoming infinite when $d_i$ is zero. In an example, $\epsilon$ can be approximately 0.001. Generally, $\lambda$ is a number between 0 and 1 that represents how much the avatar's expressive state is changed when traversing an edge. In most cases, $\lambda$ is a predetermined value. For example, if $\lambda=0$, then the avatar's expressive state becomes that of the edge that is traversed, $es(e_{best})$. If $\lambda=1$, then the avatar's expressive state is unchanged even though the selected edge, $e_{best}$, is traversed. In an example, $\lambda$ can be approximately 0.9.

An example of an ADG and its operation are illustrated in FIG. 4. In this example, the graph as two nodes $V=\{x_1, x_2\}$, with multiple edges connecting $x_1$ and $x_2$ to themselves and transitions between $x_1$ and $x_2$. In this example, the dimensionality of es is 1, so the values are (1), (0.5), (−1), (−0.5); with the one dimension of es representing 'happiness' running from −1 (sad) to +1 (happy). In further examples, each dimension of es can represent a different expressive state; for example, es might have a dimensionality of 2, so $es=(a,b)$, where the a dimension can be happiness and the b dimension can be engagement.

In the example of FIG. 4, suppose the avatar animation is at $x_1$ with an expressive state $S=1$. There are three possible transitions that can follow from $x_1$: edge A which leads back to $x_1$, edge B that leads back to $x_1$ and edge D that leads to $x_2$. Thus, the next animation sequence to be played will be one of A, B, and D. The delay module 124 determines a distance from its current state S to each of these three edges, A, B, and D, $d_A=0$, $d_B=0$, and $d_D=0.5$ respectively. The delay module 124 stochastically selects either of A, B or D based on relative probabilities using the above distances, $P_A=1/\epsilon$, $P_B=1/\epsilon$, and $P_D=1/(0.5+\epsilon)$ respectively. In an example, suppose $\epsilon$ is 0.5, then the probability proportionality values are 2, 2, and 1; which normalize to $P_A=2/5$, $P_B=2/5$, $P_D=1/5$. Suppose that B is chosen. Then the B animation sequence is displayed (in this case for a duration of 3 seconds), S is updated as $S'=\lambda S+(1-\lambda)es(B)$ and the above steps can be repeated.

In some cases, vertices in the ADG can be labelled as being a starting or a terminating node to aid in merging ADG transitions and renderings with renderings associated with responses. A node can be both an initial and terminating node. When response is to be generated, an appropriate starting and terminating node is also identified from the nodes labelled as being initial or terminating respectively.

In the present embodiments, advantageously, the system 100 renders the avatar always doing something; which it does by traversing the ADG stochastically. When the user interacts with the avatar soliciting a response, the system 100 must transition from its stochastic background appearance to one that represents interaction with the user. In most cases, the response should be presented as 'fitting in' with what the avatar is currently doing. In some cases, the system 100 can do this by having the delay module 124 identify a node in the ADG that can be used to branch out of the ADG into the utterance and then another node in the ADG to where it will return after the utterance is compete. Nodes that might be used as start points for this are generally called 'initial' nodes. Similarly, nodes that can be used to re-enter the ADG once the utterance is complete are called 'terminating' nodes. In some cases, all nodes can be predetermined to be initial and terminating nodes, or some subset of the nodes can be predetermined to be a initial node, a terminating node, or both.

In some cases, the delay module 124 can be executed on the local computing device 26, or some functions of the delay module 124 can be executed on the local computing device 26 and some on the remote computing device 32. In some cases, the avatar delay graph (ADG) approach described herein can be made more sophisticated by caching only portions of the graph on the local computing device 26 and the updating them as the state of the avatar changes. When the avatar is to render some response, a new temporary edge $E=(start, end)$ can be constructed. Here the start and end nodes can be selected from the set of initial and terminating nodes in the ADG. The end node is chosen such that it has a terminating label and a mean of $|es(end, x_k)-S|$ is minimized. Thus, when the response is generated, it can terminate in a state where there is a good exiting edge in the ADG.

The choice of start node is similar; however, it is also necessary to identify a node that can be accessed quickly in terms of transitions in the ADT in order to avoid the introduction of abrupt changes in the avatar's appearance. The start node is chosen such that it has an initial label and the cost of $\Sigma\alpha\tau(e)+(1-\alpha)|es(e)-S|$ is minimized. Where $\alpha$ is a parameter than can be used to tune between the desirability of quickly moving from the ADG to begin uttering the response ($\alpha=1$) and making the transition as smooth as possible ($\alpha=0$). Where the sum is over a path in the ADG from the avatar's current state to the start node. In essence, this selects a nearby start node such that the es values are similar to the current state of the avatar S. Note that selecting the start node also enables the determination of the expected delay before it is necessary to start rendering the response.

Once the start and end nodes have been identified, the delay module 124 begins to move deterministically through the ADT to the start node following the sequence identified in the process of identifying this node. When the delay module 124 reaches the start node it then signifies to the rest of the system 100 to execute the rendered utterance. The delay module 124 can then re-enter the ADG at the end node. Generally, the value of S can remain unchanged, although it would be possible to associate a change in S with each utterance. Once at the end node, the delay module continues its stochastic traverse through the ADG until the next response is available and the above is repeated.

Figure 5:
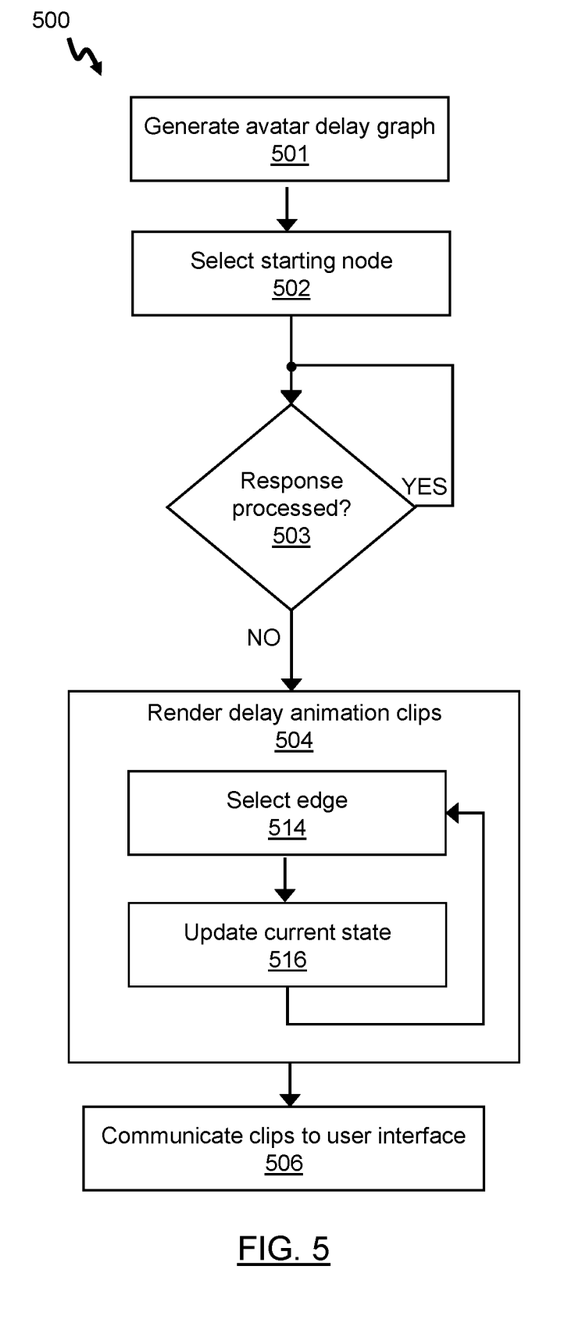
FIG. 5 is a flow chart of a method for rendering of an animated avatar, in accordance with another embodiment.

FIG. 5 shows another embodiment of a method 500 for rendering of an animated avatar using one or more delay clips between utterances of the animated avatar. At block 501, the delay module 124 generates the avatar delay graph (ADG) by associating each of the animated delay clips with an edge in the ADG and determining a playing length of the animated delay clip with the respective edge. Each edge is connected to at least one other edge via a node, each node being at a point at which the animated delay clips associated with the edges terminating and emanating at the node can be stitched together. In some cases, each node is connected to each other node via an edge. In some cases, each node also has an edge that emanates from it and terminates at itself.

At block 502, the delay module 124 selects an initial node as a current node of the ADG and communicates the associated clip to the user interface 130. In some cases, the initial node can be predetermined or selected stochastically among the available nodes.

At block 503, the delay module 124 determines whether a response is being processed, where a response is being processed if a response has been received from the response generation engine 130 or a response is currently being rendered by the rendering module 122. At block 504, while the above is negative, the delay module 124 renders one or more delay animation clips using an avatar delay graph (ADG). At block 506, when each of the delay animation clips are rendered, each respective clip is communicated to the user interface 130 via the network interface 110 to be displayed by the user interface 130 to the user in sequential order received.

As part of block 504, at block 514, the delay module 124 stochastically selects one of the edges emanating from the current node. At block 516, the delay module 124 updates the current node to be the node at which the selected edge is terminated. The delay module 124 communicates the clip associated with the selected edge to the user interface 130 to be played after the previous clip communicated to the user interface 130.

The delay module repeats blocks 514 and 516 while the condition at block 502 is negative.

The embodiments described herein advantageously provide a more realistic and interactive mechanism for human-robot interaction. The embodiments can thus be deployed in a range of different applications; for example, service roles where humans seek information from a greeter, help desk or receptionist. In one exemplary application, a greeter in a service-oriented company can be provide 24-7 by the animated avatar of the embodiments described herein. the animated avatar of the embodiments described herein can advantageously provide visually accurate, realistic, and consistent interaction with users. In some cases, the embodiments described herein can be deployed in either a fixed installation (for example, an information kiosk) or as part of an autonomous robot.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A method for rendering of an animated avatar on one or more computing devices using animated delay clips between responses of the animated avatar, the method comprising:
    generating an avatar delay graph (ADG) by associating each of the animated delay clips with a directed edge in the ADG, associating a playing length of the animated delay clip with the respective edge, each edge connected to at least one other edge via a node, each particular node associated with a point at which the animated delay clip associated with the edge terminating at the particular node can be stitched together with other animated delay clips associated with the edges emanating at the particular node;
    selecting a node of the ADG labelled as an initial node to be a current node;
    determining whether one of the responses of the animated avatar is being processed, and while there is no response being processed:
        rendering the one or more animated delay clips using the ADG, the rendering comprising:
            stochastically selecting one of the edges emanating from the current node;
            updating the current node to be the node at which the selected edge is terminated; and
            rendering the animated delay clip associated with the selected edge; and
        communicating the rendered one or more animation delay clips to be displayed.

2. The method of claim 1, wherein the rendering further comprising repeatedly:
    stochastically selecting one of the edges emanating from the current node;
    updating the current node to be the node at which the selected edge is terminated; and
    rendering the animated delay clip associated with the selected edge.

3. The method of claim 2, wherein an expressive state vector is an encoding of an expressive state of the animated avatar as perceived by the user, a current expressive state being a current value of the expressive state vector, each of the edges are associated with a value for the expressive state vector, the method further comprising selecting an initial expressive state vector as a current expressive state vector and the rendering further comprising updating the current expressive state vector based on the expressive state vector associated with the selected edge when such edge is selected.

4. The method of claim 3, wherein the edges are selected using a probability inversely proportional to a distance between the current expressive state and expressive state values associated with a respective one of the selectable edges.

5. A system for rendering of an animated avatar using one or more animated delay clips between responses of the animated avatar, the animated avatar displayed on a user interface, the system comprising one or more processors and a data storage device, the one or more processors configured to execute a delay module to:
  generate an avatar delay graph (ADG) by associating each of the animated delay clips with a directed edge in the ADG, associating a playing length of the animated delay clip with the respective edge, each edge connected to at least one other edge via a node, each particular node associated with a point at which the animated delay clip associated with the edge terminating at the particular node can be stitched together with other animated delay clips associated with the edges emanating at the particular node;
  select a node of the ADG labelled as an initial node to be a current node;
  determine whether one of the responses of the animated avatar is being processed, while there is no response being processed:
    render the one or more animated delay clips using the ADG, the rendering comprising:
      stochastically selecting one of the edges emanating from the current node with a probability inversely proportional to a distance between an expressive state vector associated with the respective edge and a vector of the same rank associated with the animated delay clip;
      updating the current node to be the node at which the selected edge is terminated; and
      rendering the animated delay clip associated with the selected edge; and
    communicate the rendered one or more animation delay clips to the user interface.

6. The system of claim 5, wherein the one or more processors of the system are on a remote computing device that is remote to a local computing device connected to the user interface, the remote computing device in communication with the local computing device over a computer network, and wherein at least one of the animated delay clips is locally cached on the local computing device.

* * * * *